United States Patent [19]

Focht

[11] 4,440,027

[45] Apr. 3, 1984

[54] VELOCITY AND MASS AIR FLOW SENSOR

[75] Inventor: Louis R. Focht, Farmington Hills, Mich.

[73] Assignee: Ford Motor Company, Dearborn, Mich.

[21] Appl. No.: 403,748

[22] PCT Filed: May 26, 1982

[86] PCT No.: PCT/US82/00733

§ 371 Date: May 26, 1982

§ 102(e) Date: May 26, 1982

[51] Int. Cl.³ .............................................. G01F 1/32
[52] U.S. Cl. .................................. 73/861.24; 73/702; 73/717
[58] Field of Search ........... 73/861.22, 861.24, 861.32, 73/861.34, 861.47, DIG. 4, 702, 717; 310/800

[56] References Cited

U.S. PATENT DOCUMENTS

| | | | |
|---|---|---|---|
| 3,116,639 | 1/1964 | Bird | 73/861.24 |
| 3,680,375 | 8/1972 | Joy et al. | |
| 3,719,073 | 3/1973 | Mahon | 73/861.22 |
| 3,769,827 | 11/1973 | Moore | 73/723 |
| 3,894,198 | 7/1975 | Murayama et al. | 310/800 X |
| 4,015,472 | 4/1977 | Herzl | 73/861.22 |
| 4,085,614 | 4/1978 | Curran et al. | 73/861.22 |
| 4,201,084 | 5/1980 | Ito et al. | 73/861.22 |
| 4,404,858 | 9/1983 | Blechinger | 73/861.02 |

*Primary Examiner*—Gerald Goldberg
*Assistant Examiner*—Brian R. Tumm
*Attorney, Agent, or Firm*—Peter Abolins; Robert D. Sanborn

[57] ABSTRACT

A mass air flow sensor (10) has a vortex generator (12) positioned in the air flow for generating two streams of vortices. Spaced vortex detectors (20), (22) are each positioned the same distance downstream of vortex generator (12) in one of the two streams of vortices. Vortex detectors (20), (22) are coupled to a differential amplifier (24) which reduces noise signals applied equally to vortex detectors (20), (22) and enhances vortex signals alternately applied to vortex detectors (20), (22).

2 Claims, 2 Drawing Figures 4,440,027

VELOCITY AND MASS AIR FLOW SENSOR

TECHNICAL FIELD

This invention relates to measurement of fluid flow.

BACKGROUND ART

Various apparatus for the measurement of fluid velocity are known. First, a system for measuring the relative velocity between a body and a contiguous fluid includes an impeller or rotor which is rotatably pivoted on the body immersed in the fluid. Flow of the fluid relative to the body causes the impeller or rotor to rotate with an angular velocity dependent on the relative velocity between the body and the fluid. This rotation may operate, by electrical or mechanical means, an indicator which is suitably calibrated to indicate relative velocity. Disadvantages of such an arrangement include that the angular velocity of the impeller or rotor is not accurately proportional to the relative velocity between the fluid and the body.

An apparatus related to the previously discussed impeller rotor is a vane-like obstruction in the fluid path. The amount of deflection of the vane is proportional to the fluid velocity. Deflection of the vane can be sensed by any of a variety of means such as movement of a slider along a resistance thereby varying the resistance proportional to vane deflection.

Also known are hot wire fluid flow sensors wherein the motion of the fluid past a heated wire cools the wire. The amount of cooling is dependent upon the amount of fluid flowing past the wire. The amount of cooling of the wire can be determined by a resistance change which can be measured in any number of ways. Thus, a hot wire fluid flow sensor can measure the mass of the fluid flowing past the sensor. It is advantageous to know the mass of the air entering an internal combustion engine when establishing an air fuel ratio. Disadvantages of such an apparatus include that various impurities in the fluid may be deposited on the wire and cause an erroneous indication of fluid mass flow.

Another method of determining fluid velocity uses an object placed in the fluid flow to create a fluctuating flow of vortices in the wake of the object located in the fluid, i.e., Karman vortices. Alternatively, vanes can be placed in the fluid flow to induce a swirl having a cork screw shape. The rate of passage of the ridges and troughs of the cork screw are an indication of fluid velocity.

It is known that the Karman vortices tend to be formed on the downstream side of the object at regular intervals and alternately, first behind one side edge of the object and then behind the opposite side or edge. The vortices detach themselves from the object in two nearly parallel rows and are carried downstream at a velocity substantially proportional to, but somewhat less than, the relative velocity of the fluid. That is, the vortices have a slip velocity which tends to bear a constant ratio to the velocity of the fluid. It is also well known that in each row the vortices are formed at a distance apart which tends to bear a constant ratio to the size of the object but substantially independent of the relative velocity of the fluid. From these considerations it has been shown that the frequency at which vortices are formed behind either side or edge of a cylinder tends to be proportional to the relative velocity of the fluid and inversely proportional to the size of the cylinder, but to depend substantially upon no other factor or parameter.

The phenomenon of alternate vortex formation in two rows in this way occurs frequently in the natural world, and is known to be the cause of, for example the "singing" of telegraph wires in the wind, the "sighing" and "roaring" of wind in trees, and the "whistling" of wind through tall grasses.

However, reliable, accurate and inexpensive measurement of these vortices to determine fluid flow has presented a problem. For example, U.S. Pat. No. 3,116,639 issued to W. G. Bird teaches positioning a vane-like element mounted for oscillatory movement about an axis extending at right angles to the direction of flow of the fluid and positioned downstream of the vortex generator. The frequency of oscillation of the vane-like element is measured and is related to the frequency with which vortices pass the element. The response time of such a system is, of course, related to the mechanical response of the system. That is, the vane-like element may not be able to respond to the changes in velocity. Further, the strength of the vortices must be sufficiently strong to cause movement of the vane-like element.

Another method and apparatus for determining the passage of a vortex is taught in U.S. Pat. No. 3,680,375 issued to R. D. Joy et al. A sonic signal transmitting transducer is located on one side of the wake of vortices and a sonic signal receiving transducer is located on the other side of the wake. The transmitting transducer signal is modulated by the Karman vortices and received by the receiving transducer. An electronic signal detector is connected to the signal receiving transducer for detecting the modulations created by the Karman vortices. Here again, the vortices must be of sufficient magnitude to cause modulation of the sonic signal. Further, modulation of a sonic signal may occur due to disturbances in the fluid flow other than vortices thus causing erroneous signals. Still further, relatively complex electronics is required to properly process modulation of the sonic signal to determine if a vortex has passed. These are some of the problems this invention overcomes.

DISCLOSURE OF THE INVENTION

In accordance with an embodiment of this invention, a device for measuring the velocity of fluid includes a vortex generating means, a pressure sensor means and a processing means. The vortex generating means is positioned in a fluid stream so that two streams of vortices are formed in the wake of the generating means. The pressure sensor means has two vortex detectors, one vortex detector being positioned in each one of the two streams of vortices formed in the wake of the generating means for sensing a pressure variation caused by the passage of the vortices. Since the vortices in each stream alternate, vortex detectors positioned the same distance downstream from the vortex generating means are exposed to the greatest possible pressure differential. This improves vortex detection. Further, noise in the fluid flow stream affects each vortex detector equally and can be cancelled out. The processing means is coupled to the pressure sensor means for determining the fluid flow rate as a function of pressure changes sensed by the pressure sensor means.

BEST MODE FOR CARRYING OUT THE INVENTION

Figure 1:
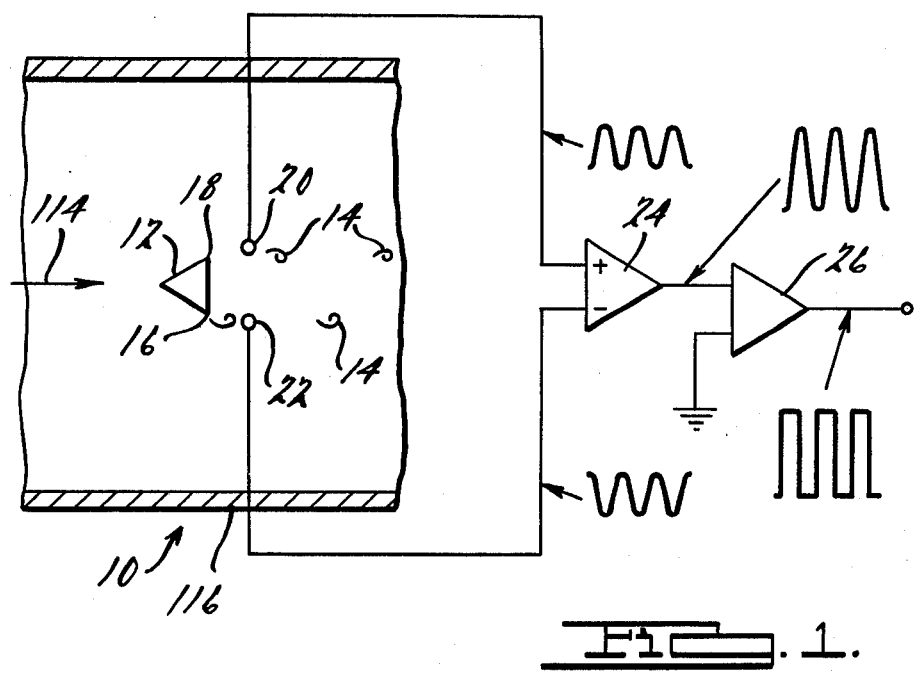
FIG. 1 is a cross section, partly block, view of a velocity and mass air flow sensor in accordance with an embodiment of this invention using electrical transducers coupled to a differential amplifier.

Referring to FIG. 1, a mass air flow sensor 10 includes a vortex generator 12 positioned in the air flow. Vortex generator 12 is generally an elongated member transverse to the direction of air flow and can have any of a number of cross sectional configurations such as the triangular one shown. Vortex generator 12 creates vortices 14 off the two sides 16 and 18 of vortex generator 12. A vortex detector 20 is positioned in the stream of vortices generated by trailing side 18, and a vortex detector 22 is positioned in the stream of vortices generated by trailing side 16. Vortex detectors 20 and 22 are each positioned the same distance downstream of vortex generator 12 and produce an electrical signal in response to pressure variations. For example, a microphone can be used as a vortex detector. Electrical connecting wires through a wall 116 couple vortex detectors 20 and 22 to a differential amplifier 24. The output of differential amplifier 24 is coupled to a threshold detector 26. Vortex detector 20 is coupled to the noninverting input of differential amplifier 24. Vortex detector 22 is coupled to the inverting input of differential amplifier 24. The output of differential amplifier 24 is coupled to the first input of threshold detector 26. The other input of threshold detector 26 is grounded. Threshold detector 26 produces an output signal whenever the output of differential amplifier 24 exceeds a predetermined threshold, such as ground potential.

In operation, air flow in a direction parallel to arrow 114 impinges on vortex generator 12 to produce vortices which are shed alternately from sides 16 and 18. Thus, as the vortices pass vortex detectors 20 and 22, first one vortex detector senses a vortex and then the other vortex detector senses a vortex. The outputs of the two vortex detectors 20 and 22 are thus 180° out of phase. The subtraction of these two signals in the differential amplifier 24 results in a signal which is twice each individual input. Turbulence and noise signals are split into two equal parts by vortex generator 12 and reach the two vortex detectors 20 and 22 at the same time and phase. Thus, when these signals are subtracted by differential amplifier 24 they are cancelled. The result is an improved signal to noise ratio. FIG. 1 also shows the waveforms of the signal applied by vortex detectors 20 and 22 to differential amplifier 24 and the output threshold detector 26.

Figure 2:
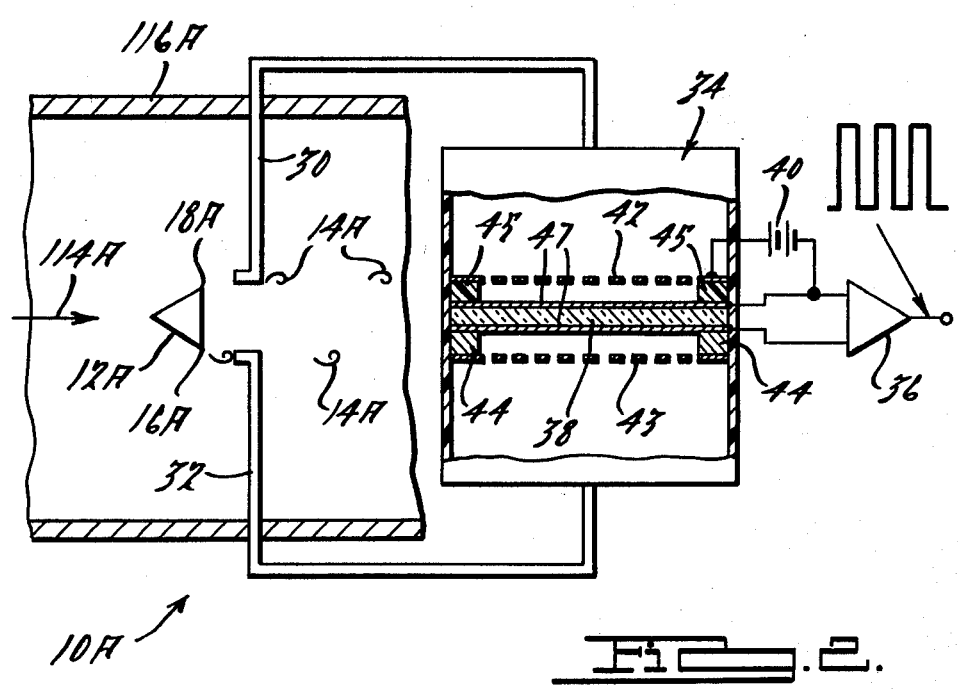
FIG. 2 is a view similar to FIG. 1 except that the transducer is replaced by an acoustic pickup leading to a differential microphone.

Referring to FIG. 2, a mass air flow sensor 10A includes a vortex generator 12A similar to that described in connection with FIG. 1. Sides 16A and 18A produce two spaced streams of vortices 14A. Sensor 10A includes a pair of acoustic pickup tubes such as a pitot tube 30 having an opening positioned downstream of the stream of vortices generated by side 18A and a pitot tube 32 positioned downstream of the vortices produced by side 16A. The openings of tubes 30 and 32 are positioned the same distance downstream of vortex generator 12A. Pitot tubes 30 and 32 are coupled through a wall 116A of mass air flow meter 10A to a pressure transducer such as a differential microphone 34. Pitot tubes 30 and 32 are generally hollow cylindrical elongated passages which convey pressure variations at the openings adjacent vortex generator 12A to differential microphone 34. Differential microphone 34 takes the pressure variations sensed by pitot tubes 30 and 32 and changes them to electrical signals which are applied to a threshold detector 36.

Differential microphone 34 includes a piezo electric polymer diaphragm 38 which generates an electric signal responsive to stress induced by the pressure differentials on either side of diaphragm 38. The vortex pressure signal delivered by tubes 30 and 32 drives diaphragm 38 in a push-pull fashion thus doubling the effect of each individual signal. In contrast, turbulence and acoustic noise is cancelled because it produces an equal and in phase pressure on each side of diaphragm 38. Advantageously, one of the connections between the piezo electric polymer film diaphragm 38 and threshold detector 36 includes a battery 40 coupled to a polarizing screen 42 for establishing a mechanical bias on diaphragm 38 to eliminate signal distortions as diaphragm 38 passes through its mid position. A second screen 43 on the other side of diaphragm 38 is provided so that identical acoustic chambers exist on each side of diaphragm 38. This insures differential action over a broad frequency range. Screen 43 is electrically connected to the adjacent side of diaphragm 38 by a conductor 44. In contrast, screen 42 is electrically insulated from diaphragm 38 and is supported by insulators 45. Advantageously, diaphragm 38 has an aluminized coating 47 on each side to provide a connection to the piezo electric material of diaphragm 38.

Screen 42 has an opposite electrical charge from the charge on the adjacent aluminized coating 47 on diaphragm 38. As a result, diaphragm 38 is bowed and a biasing voltage produced and applied to threshold detector 36. Applying pressure differentials to diaphragm 38 causes variation about the bias voltage and not about zero volts. It is undesirable to have the output voltage of diaphragm 38 vary about zero because of a delay and non-linearity when the output voltage of diaphragm 38 crosses zero.

Referring to FIG. 2, in operation, air flows into mass air flow sensor 10A in the direction of arrow 114A. The air striking vortex generator 12A generates two wakes of vortices. The sequential forming of vortices alternates between sides 16A and 18A so that the vortices in the two streams are staggered. As the vortices approach the frontal opening of pitot tubes 30 and 32, a pressure disturbance takes place. That is, the swirling vortex produces a pressure variation with respect to the background pressure. Variation in the static pressure background would effect the pressure detected by both tubes 30 and 32 and be cancelled out in differential microphone 34. However, an oscillating pressure variation which affects tubes 30 and 32 differently would be indicative of passing vortices and would be amplified by microphone 34. The pressure variation is transmitted along pitot tubes 30 and 32 to microphone 34 which produces electrical signals in response to frequency pulsations indicative of passing vortices in excess of changes in background pressure. The electrical signal produced by threshold detector 36 can be further processed to compute the velocity of the air flow or to compute the mass of the air flow when background pressure and fluid temperature are taken into account. It may be desirable to obtain a separate indication of the background static pressure for use in density calculations.

When controlling air fuel ratios for internal combustions engines it is often desirable to know the mass flow, which is calculated from the equation $$m = (\rho A)(V)$$

m = mass flow rate kg/s
$\rho$ = density kg/m$^3$
A = cross sectional area m$^2$
V = velocity m/s The density is independent of pressure for incompressible fluids such as water, but dependent upon pressure, P, and temperature, T, for gases such as air, according to the equation.

$$\rho = (i\, P/RT)$$

wherein R is a proportionality constant.

The pressure term used in the above equation is the background pressure. A temperature sensor can provide an electrical signal indicative of temperature. This temperature information can be incorporated in the above calculation to determine the mass of air flowing through the mass air flow sensor.

Various modifications and variations will no doubt occur to those skilled in the various arts to which this invention pertains. For example, the particular positioning of the pressure sensor downstream of the vortex generator may be varied from that disclosed herein. These and all variations which basically rely on the teachings through which this disclosure has advanced the art are properly considered within the scope of this invention.

I claim:

1. A device for measuring the velocity of a fluid comprising:

a vortex generating means positioned in a fluid stream so that a first stream and a second stream of vortices are formed in the wake of said generating means;

a first pitot tube pressure sensor means positioned in said first stream of vortices for sensing and conducting a pressure variation caused by the passage of the vortices;

a second pitot tube pressure sensor means positioned in said second stream of vortices for sensing and conducting a pressure variation caused by the passage of the vortices;

said first pressure sensor means and said second pressure sensor means being positioned substantially the same distance downstream of said vortex generating means;

a differential processing means coupled to said first and second pressure sensor means for inverting the input from one of said first and second pressure sensor means thereby increasing pressure variations between the two and cancelling out pressure variations common to said first and second pressure sensor means;

said differential processing means including a differential microphone having a diaphragm, a first chamber on one side of said diaphragm being coupled to said first pressure sensor means, and a second chamber on the other side of said diaphragm being coupled to said second pressure sensor means;

a threshold detector with an inverting and a non-inverting input coupled to the output of said differential microphone;

said differential microphone being formed of a generally planar piezoelectric material, each side having a conducting means, one conducting means being connected to said inverting input and the other conducting means being connected to said non-inverting input of said threshold detector; and a polarizing screen adjacennt to and insulated from said diaphragm and a polarizing voltage being applied between said polarizing screen and the adjacent one of said conducting means thereby bowing said diaphragm and producing a bias voltage.

2. A device as recited in claim 1 further comprising a second screen on the opposing side of said diaphragm from said polarizing screen for equalizing frequency response on both sides of said diaphragm.

* * * * *